United States Patent [19]

Pearson

[11] 4,419,401

[45] Dec. 6, 1983

[54] FIRE RETARDANT CONCENTRATES AND METHODS

[76] Inventor: Glenn A. Pearson, 3709 S. George Mason Dr., Falls Church, Va. 22041

[21] Appl. No.: 404,915

[22] Filed: Aug. 3, 1982

[51] Int. Cl.³ .......................... B32B 7/00; C08L 61/02
[52] U.S. Cl. .................................... 428/262; 428/276; 428/528; 428/530; 428/921; 427/389.9; 427/391; 427/392; 427/393; 427/393.3; 524/247; 524/416; 524/707
[58] Field of Search ...................... 524/247, 416, 707; 428/262, 276, 528, 530, 921; 427/389.9, 391, 392, 393, 393.3

[56] References Cited

U.S. PATENT DOCUMENTS

| | | | |
|---|---|---|---|
| 2,452,054 | 10/1948 | Jones et al. | 260/17.3 |
| 2,632,742 | 3/1953 | Eckert | 524/416 |
| 3,883,462 | 5/1975 | Pearson | 260/850 |
| 3,983,269 | 9/1976 | Pearson | 427/370 |
| 3,984,367 | 10/1976 | Pearson | 428/264 |
| 3,990,977 | 11/1976 | Pearson | 252/8.1 |
| 4,119,598 | 10/1978 | Pearson | 260/29.4 |
| 4,215,172 | 7/1980 | Pearson | 428/264 |

OTHER PUBLICATIONS

S. N. 404,916, Pearson, Aug. 3, 1982.

*Primary Examiner*—Joseph L. Schofer
*Assistant Examiner*—N. Sarofim
*Attorney, Agent, or Firm*—Lowe, King, Price & Becker

[57] ABSTRACT

There is disclosed a flame retardant composition suitable for application to a variety of textile and textile related products. The formulation is a water based liquid polymeric concentrate comprising about 35–65 parts of ammonium phosphate, about 10–30 parts of ammonium sulfate, about 40–60 parts of an alkanolamine, about 40–60 parts of phosphoric acid, about 20–40 parts of an aldehyde, in 100–140 parts by weight of water.

15 Claims, No Drawings

FIRE RETARDANT CONCENTRATES AND METHODS

FIELD OF THE INVENTION

The present invention relates to nitrogen and phosphorus based aqueous solutions of liquid polymeric concentrates compounded for application to a variety of textile and textile related products, and more particularly relates to a fire-retardant composition containing nitrogen and phosphorus components which is particularly suitable for application to fabric since it does not affect the hand of the fabric, does not leave residual odors and does not result in deterioration of fabric strength.

BACKGROUND ART

There is substantial literature including the use of urea-formaldehyde resinous systems known in the art for application to textiles and similar cellulosic and synthetic resin substrates. In order to improve the characteristics of such substrates a number of systems of this type based on urea-formaldehyde are described in my prior U.S. Pat. Nos. 3,883,462, 3,983,269, 3,984,367, 4,119,598 and 4,215,172. All of these prior patents described urea-formaldehyde compositions for use as coatings on textiles and the like. In my prior U.S. Pat. No. 3,990,977 is described a composition for use in cleaning and fire-proofing substrates such as carpets, rugs and the like, which comprises a composition somewhat similar to that disclosed and claimed herein. However, the present composition is an improvement over my prior patent.

SUMMARY OF THE INVENTION

It is accordingly a primary object of the present invention to provide a nitrogen and phosphorus based flame retardant liquid polymeric concentrate particularly suitable for application to a variety of textile and textile related products.

A further object of the invention is to provide a fire retardant composition which will provide fire retardant characteristics to textiles without adversely affecting the hand of the textiles, without leaving residual odors, and without deterioration of fabric strength.

A still further object of the invention is to provide a water based liquid polymeric concentrate which contains nitrogen and phosphorus components which will provide sufficient fire retardant characteristics to textile products to overcome the disadvantages of similar compositions known to the prior art.

Other objects and advantages of the present invention will become apparent from the following detailed description.

In satisfaction of the foregoing objects and advantages there is provided by this invention a polymeric concentrate suitable for application to textiles to provide fire retardant and other characteristics thereto, which composition is as follows:

| COMPONENT | PARTS BY WEIGHT |
| --- | --- |
| Ammonium Phosphate | 35–65 |
| Ammonium Sulfate | 10–30 |
| Alkanolamine | 40–60 |
| Phosphoric Acid | 40–60 |
| Aldehyde | 20–40 |
| Water | 100–140 |

DESCRIPTION OF THE PREFERRED EMBODIMENTS

As pointed above, the present invention is concerned with a nitrogen and phosphorus based resinous concentrate which has unique characteristics and which is an improvement over the resinous systems described in my prior patents and pending application Ser. No. 214,017, filed Dec. 5, 1980. The resinous system of this invention is particularly suitable as a coating to provide fire-retardance and stain resistance to cellulosic and synthetic products generally and particularly for use as a coating for fabrics, as well as paper, cardboard, wood, or any other material which is subject to burning. The composition of the invention is particularly useful for padding and top coating for textile products or fabrics such as ticking, drapery stocks, wall coverings, and upholstery fabrics as the concentrate forms a clear, hard, nonburning finish to the substrate.

In its broadest aspects, the invention comprises the following components:

| COMPONENT | PARTS BY WEIGHT |
| --- | --- |
| Ammonium Phosphate | 35–65 |
| Ammonium Sulfate | 10–30 |
| Alkanolamine | 40–60 |
| Phosphoric Acid | 40–60 |
| Aldehyde | 20–40 |
| Water | 100–140 |

The ratios given above should not deviate from the stated amounts by more than about 15% because the unique properties of the polymer will be affected and to this extent the ratios are critical.

The ammonium phosphate and ammonium sulfate are generally used in the solid forms which are available commercially. Equivalent materials may of course be used provided the same results are achieved. The phosphoric acid is preferably added as an 85% aqueous solution, as this form is commerically available.

As the aldehyde, one may use a simple aldehyde, such as formaldehyde, acetaldehyde, paraldehyde, glyoxal, or other mono-, di, or poly-aldehydes. In addition, any substance yielding or acting as an aldehyde may be used. Formaldehyde is the preferred aldehyde as it is conveniently obtained commercially as a 37 weight percent aqueous solution.

The preferred alkanolamine will have 1 to 4 carbon atoms in the alkyl group, and the most preferred alkanolamine is triethanolamine, but others such as diethanolamine or mixtures may also be used. Triethanolamine is commercially available as a 98–99 weight percent solution.

In producing the formulation of the present invention, the ammonium phosphate, the ammonium sulfate, and the alkanolamine are combined and stirred continuously into the water until a clear solution is obtained. In a separate vessel the phosphoric acid and formaldehyde are combined and then added to the water solution prepared in the first vessel. On addition of the phosphoric acid-formaldehyde mixture, an exothermic reaction occurs so that the solution is continued to be stirred until a clear solution is obtained and the solution is cooled. The resulting solution is a clear stable solution which has good storage characteristics. It is a concentrate which reduces shipping costs. In use it is diluted with a 3 parts water per part of concentrate and can be applied by inversion coating or a spray.

A more preferred formulation will contain about 40-60 parts of the ammonium phosphate, about 15-25 parts of the ammonium sulfate, about 45-55 parts of the alkanolamine, about 45-55 parts of phosphoric acid, about 25-35 parts of formaldehyde to about 110-130 parts of water.

It has been found that formulations produced according to the present invention are particularly suitable for application to textile and textile related products since they do not adversely affect the hand of the fabric treated and do not leave residual odors on the fabric. Moreover, there is no apparent deterioration of fabric strength and the composition is non-hygroscopic. When applied to the top surface of the fabric, the fabric will pass the smolder test for fire retardancy and when immersed in the recommended concentrate, the treated fabric will pass the verical flame test.

When applied to the textiles, the concentrate is diluted with water in a ratio of about one part concentrate for three parts of water. It is then applied to the textiles by inversion coating or as a spray, but is preferably used in a conventional pad bath. It should be noted that it may be applied by any conventional method normally used in the textile industry to apply coatings of this type to textiles. The coating is applied to the fabric in sufficient amount for the fabric to pick up about 10-40 weight percent after evaporation of the water. It is particularly preferred to add a minimum of about 25% wet concentrate to fabric weight to insure passage of the fire retardant tests.

After application of the solution to the fabric, the fabric is then dried, and drying is an important aspect of the present invention. It is preferred that drying be carried out at temperatures of about 250°-350° F. (156°-212° C.) which is sufficient to dry and cure the concentrate in the fabric. The drying and curing at this temperature are necessary to complete the reaction and to achieve good cross-linking of the concentrate with the fabric. If desired, the fabric could be initially air dried or dried at a lower temperature and then cured at the temperatures described.

In the formulation, the ammonium phosphate and the ammonium sulfate are normally available as solid components and are used in this form. The ammonium phosphate provides fire retardant characteristics to the concentrate, dissolves readily into water and provides an endothermic reaction at the composition.

The ammonium sulfate component also provides fire retardant characteristics and prevents the resulting concentrate from being hygroscopic when applied to the fabric. The alkanolamine, which is preferably triethanolamine, is added to neutralize the acidity of the composition which is indicated by a cloudy solution. Thus, the alkanolamine also is necessary to complete the reaction.

The formaldehyde and phosphoric acid are mixed together prior to addition to the remaining components and in combination with the other components provide the resulting polymeric concentrate which provides the unique characteristics of the composition of the present invention.

In further aspects of the invention, it is also useful to add a wetting agent or a surfactant to the composition in an amount of about 1-3 parts by weight for additional advantages. A suitable surfactant is sold commercially under the trade name TRITON X-100.

A further important component which may be added to the composition is one of several fluoropolymer dispersions which will provide soil and stain resistance as well as water repellancy to the composition. Materials of this type are sold commercially by E. I. DuPont as Teflon type materials sold under the trade name NPA. The materials are added in amounts of about 5-10 weight percent, based on the total composition. When this soil and stain resistant material is added, the treated fabric should be dried and cured at temperatures of about 325°-350° F. (198°-212° C.).

The composition of the present invention is particularly suitable for padding and top coating of fabrics to provide the flame retardant characteristics, together with soil and stain resistance. The composition is particularly suitable for treating ticking, drapery stocks, wall coverings, upholstery fabrics and the like.

The following examples are presented to illustrate the invention but it is not to be considered as limited thereto. In the examples and throughout the specification, parts are by weight unless otherwise indicated.

EXAMPLE 1

The following formulation was prepared:

| COMPONENTS | PARTS |
| --- | --- |
| Ammonium Phosphate | 50 |
| Ammonium Sulfate | 20 |
| Triethanolamine | 50 |
| Phosphoric Acid | 60 |
| Formaldehyde | 80 |
| Wetting Agent | 2 |
| Water | 120 |

The formulation was prepared by combining the ammonium phosphate, ammonium sulfate and triethanolamine and stirring into the water until a clear solution was obtained. In a separate vessel the phosphoric acid and formaldehyde were combined and then added to the aqueous solution of the other components. When the phosphoric acid and formaldehyde were added, an exothermic reaction occurred and the solution was stired continuously until the resulting composition was cooled and clear. At this point, the two parts of the wetting agent, which is a commercially available wetting agent sold as TRITON X-100, were added.

EXAMPLE 2

A swatch of 100% cotton bed ticking, 8 ounce per square yard by weight in a blue and white stripe, was obtained and a 42" by 42" sample was treated with the solution of Example 1 to which had been added 38 parts by weight of the Teflon product sold commercially by E. I. DuPont as NPA as a soil and stain resistant agent. In treating the fabrics, sufficient solution was added to provide 35% by weight of the cotton ticking of the solution plus sufficient water to wet out the sample. The sample was then dried with a hot air hand-held blower and cured and pressed on a hot head press at 340° F. (206° C.) for 30 seconds. The sample was then tested for a vertical burn using a Bunson Burner with the tip of the flame touching the edge of the fabric in a vertical position. The flame was held for 15 seconds and a char of 2½" resulted. On removal of the Bunson Burner, the flame extinguished itself.

The sample also passed the soil and stain resistant test or the so-called "Scotch-Guard" test. In this test, oil and water drops are applied to the fabric. If the drops disappear or enter the fabric within five seconds, the test is a failure. If the drops remain on the fabric for more than five seconds, the test has been passed. In this case, the drops remained for at least 30 seconds and the test was passed.

In a test for durability, a part of the sample is then handwashed in warm water in a commerical soap, such as Ivory Liquid in this case. The fabric is then rinsed and dried and then again subject to the flame test and "Scotch-Guard" test. It was noted that none of the fire resistance had been removed since the fabric after laundering continued to pass the burning and the soil and stain resistance test.

It was unexpectedly discovered in these tests that the combination of the fire retardant components of the concentrate together with the NPA fluoride component appeared to lock and protect the salts from washing out of the solution on repeated washings, thus allowing the ticking sample to be surface scrubbed or wiped after body fluids have come into contact with the ticking. The soil and stain resistant fluoride appears to prevent the body fluids from penetrating the mattress ticking.

The hand and color of the fabrics were not affected by the treatment. Also, the physical characteristics of the cottons were tested for breaks and tears without noticeable difference between the treated and the untreated samples.

This was an unexpected benefit, as most fire retardant salts at elevated temperatures destroy up to 50% and more of the tensile strength of the cotton and cause it to become stiff.

EXAMPLE 3

A production run was made in a commercial finishing plant. Various blends of man-made fabrics and 100% cotton upholstery fabrics were treated by using a conventional padder. About 100 gallons of dilute solution of fire retardant concentrate of Example 1, which included the additional 10% of the fluoride product sold by E. I. DuPont as NPA Teflon, and water, were used as the composition. The ratio of fire retardant composition to the Teflon added was about 9:1. About two parts of water to one of concentrate were used. The fabrics were run at 100% wet out, thus giving 33.3% wet add on of fire retardant and soil and stain resistance solution. All fabrics had good hand and the colors were not adversely affected. All samples passed the cigarette and smolder test and all fabrics passed the soil and stain resistance test.

EXAMPLE 4

A trial production run was made in a finishing plant in North Carolina using the following formulation:

| COMPONENT | |
|---|---|
| Water | 10 lbs. |
| Ammonium Sulfate | 5 lbs. |
| Ammonium Phosphage | 5 lbs. |
| 99% Triethanolamine | 5 lbs. |
| 85% Phosphoric Acid | 4 lbs. |
| Calcium Stearate | 1.5 lbs. |
| GAF Igepal CO-887 (Surfactant) | 3.5 oz. |
| DuPont Nalan W | 7 lbs. |
| DuPont NPA Teflon | 7 lbs. |

In this formulation, the calcium stearate, the DuPont Nalan and NPA Teflon were soil and stain resistant agents, and the GAF Igepal CO-887 was nonylphenoxypoly (ethyleneoxy), a surfactant.

To prepare the composition, the water, ammonium sulfate, ammonium phosphate, triethanolamine and phosphoric acid were mixed with stirring until a clear solution was obtained. The calcium stearate was added followed by the Igepal CO-887 with high speed stirring, from which a thick emulsified paste was produced. The soil and stain resistant agents were then added with light stirring to produce a thick stirrable liquid concentrate.

When diluted with water for application, approximately two parts water to one part of the composition were needed to pass the vertical flame test.

In this test, a number of fabrics were run at the same time ranging from 100% cotton to blends of nylon, polyester acetates, wools, and cottons using various percentages of each. This was a trial run to see the effect on the various fabrics, as to color change, hand, breaks and tears, abrasion, durability, and hygroscopic tendencies. All the fabrics showed favorable results.

A swatch of the 100% cotton fabric was selected and tested for the vertical burn test by holding a cigarette lighter for 10 seconds on a lower edge in a vertical position. The flame, after removing the lighter, continued to burn for about 5 seconds, making a char of approximately 2 inches in length, which is acceptable. The 100% cotton materials react to flame and smolder burns to a greater degree than the synthetic and cotton blends.

EXAMPLE 5

A mock-up of an untreated upholstery fabric was prepared simulating a chain cushion and back, using polyurethane foam as the cushion material and following UFAC (Upholstery Furniture Action Council) recommended test procedures. A lighted cigarette was placed in the crack of the mock-up of the back and cushion. After 15 minutes, the cigarette was about three-quarters consumed and heavy smoke poured from the burning urethane foam. In another 10 minutes, small flames were noted. The test ended by extinguishing the flames with water.

EXAMPLE 6

The same procedure was used as in Example 5, using the same fabric treated with the formulation of Example 4. A lighted cigarette was placed in the crack between the cushion and back under the same conditions. The test ended after observation for 30 minutes. There was no evidence of fire. The char did not extend beyond the length and width of the cigarette, which extended into the polyurethane foam with no ignition.

EXAMPLE 7

A sample of 100% cotton ticking was treated for soil and stain and fire retardant finish using 30% wet add on of the formula of Example 4, giving a good hand, little if any tenderizing of the fibers and no color change. The sample was cured at 325° F. (198° C.) for 20 seconds on a hot head press giving a smooth finish. The sample passed the vertical flame and the soil and stain resistance tests. After one warm water hand wash using Ivory Liquid detergent and agitating for about 5 minutes, followed by rinsing in fresh warm water to remove any residual detergent, the sample was dried, and pressed again for smoothness. The sample was again tested for soil and stain and in the vertical flame test. The sample passed both tests with little or no loss of fire retardance and soil and stain resistence. The combination of fire retardant salts and soil and stain resistant components included in the formulae appeared to lock in the fire retardant salts, which was an unexpected result.

The invention has been described herein with reference to certain prefered embodiments; however, as obvious variations will become apparent to those skilled in the art, the invention is not to be considered as limited thereto.

What is claimed is:

1. A concentrate comprising the reaction product of (a) about 35-65 parts by weight of ammonium phosphate, (b) about 10-30 parts by weight of ammonium sulfate, (c) about 40-60 parts by weight of an alkanolamine, (d) about 40-60 parts by weight of phosphoric acid, and (e) about 20-40 parts by weight of an aldehyde, said concentrate being contained in about 100-140 parts of water and forming flexible, hard nonburning coatings on substrates.

2. A concentrate according to claim 1 wherein the composition also contains at least one soil and stain resistant agent.

3. A concentrate according to claim 1 wherein the ammonium phosphate is present in an amount of about 35-65 parts by weight, the ammonium sulfate is present in an amount of 10-30 parts by weight, the alkanolamine is present in an amount of about 40-60 parts by weight, the phosphoric acid is present in an amount of about 40-60 parts by weight, and the aldehyde is present in an amount of about 25-35 parts, all contained in about 110-130 parts of water.

4. A concentrate according to claim 3 which contains about 5-10 weight percent of at least one soil and stain resistant ingredient.

5. A concentrate according to claim 4 which contains 1-3 parts by weight of a surfactant.

6. A concentrate according to claim 1 wherein the aldehyde is a 37% aqueous solution of formaldehyde.

7. A concentrate according to claim 1 wherein the phosphoric acid is 85% aqueous phosphoric acid.

8. A concentrate according to claim 1 wherein the concentrate contains about 50 parts of ammonium phosphate, about 20 parts of ammonium sulfate, about 80 parts of a 37% solution of formaldehyde, about 50 parts of triethanolamine, and about 60 parts of 85% phosphoric acid, in about 120 parts of water.

9. A concentrate according to claim 8 which also contains about 1-3 parts by weight of a surfactant and about 5-10 weight percent of at least one soil and stain resistant agent.

10. A wood substrate treated with a concentrate of claim 1, dried and cured.

11. A paper or cardboard substrate treated with a concentrate of claim 1, dried and cured.

12. Textiles treated with a concentrate of claim 1, dried and cured.

13. Fabrics coated or impregnated with a concentrate of claim 1, dried and cured.

14. Synthetic fabrics treated with a concentrate of claim 1, dried and cured.

15. A method for imparting fire-retardant characteristics to cellulosic and synthetic resin materials which comprises treating the materials with a concentrate according to claim 1, drying and curing.

* * * * *